Patented Oct. 21, 1941

2,259,484

UNITED STATES PATENT OFFICE 2,259,484

PROCESS OF TREATING CALCINED LITHOPONE

Kenneth S. Mowlds, Baltimore, Md., assignor to The Glidden Company, Cleveland, Ohio, a corporation of Ohio No Drawing. Application October 10, 1940, Serial No. 360,592

12 Claims. (Cl. 106—295)

The present invention relates to the treatment of lithopone and particularly relates to the treatment of calcined lithopone to retard the discoloration at baking temperatures of baking enamels containing the lithopone.

Ordinary lithopone, while being an excellent pigment for some purposes, has the disadvantages that when used in baking enamels it has caused discoloration of the baked enamel. This undesirable property has lessened its use for this purpose, and if this discoloration could be retarded its usefulness in baking enamels should be increased.

It is accordingly an object of this invention to provide a method whereby the discoloration of lithopone in baking enamels is retarded.

Another object of the invention is to provide a lithopone, discoloring action of which is retarded in baking enamels.

A further object is the provision of a baking enamel containing lithopone, discoloration of which is retarded when baked.

Ordinary uncalcined lithopone (when the pigment is on the acid side) contains loosely held foreign salts and sulfides of the alkaline earth group, zinc salts, aluminum salts, etc. These salts and sulfides are in active condition and, while loosely held, cannot be removed by ordinary washing methods. When the uncalcined lithopone pigment is on the basic side, the foreign substances occur in the corresponding hydroxides or carbonates of the metals. In ordinary calcined lithopone, which is usually on the basic side, the foreign matter comprises the oxides of zinc, aluminum, magnesium, calcium, strontium and barium. If the calcined lithopone pigment is on the acid side, the foreign matter comprises the salts of zinc, aluminum and the metals of the alkaline earth group. It is believed that the discoloration resulting in baked enamel at the temperatures at which it is baked is due to these foreign substances in the uncalcined and calcined lithopone employed in such enamels.

According to the present invention, calcined lithopone is first treated with an aqueous acid solution to react with the foreign oxides of zinc, aluminum and metals of alkaline earth group, when the pigment is on the basic side, or to loosen and free the salts of zinc, aluminum and the metals of the alkaline earth group, when the pigment is on the acid side, and then forming with the metals of the resulting salts innocuous, non-reactive, insoluble organic compounds. It has been found that, if the acid treated pigment is reacted with a proteinate thereby producing proteinates of the metal of the salts formed or freed by the first acid treatment, the discoloration of baking enamels employing the pigment so treated is greatly retarded, as compared with baking enamels employing lithopone not so treated.

The object of the acidification is to transform the said foreign substances into a condition in which they more readily react with the particular soluble proteinate. While washing of the acid treated pigment is preferred, it is not essential. The amount of acid used may vary over rather wide limits, a pH of about 4 having been found to give excellent results. Any suitable acid may be used, but I prefer mineral acids which have a high dissociation constant, such as hydrochloric, sulfuric, etc. Hydrochloric acid has been found preferable to sulfuric.

Upon the addition of the necessary water soluble proteinate a reaction takes place between the salts and the proteinate with the formation of insoluble proteinates. The active foreign substances of the calcined lithopone are thus converted into a form in which they are non-reactive and the reactions which promote the discoloration are thus avoided. Accordingly, for the best results the amount of proteinate added should be at least sufficient to convert the active compounds remaining after the acid treatment to insoluble proteinates, although more may be added if desired. In such a case the excess will be either washed out, or it may be retained for giving other properties to the pigment, as is known to those skilled in the art. An amount of sodium caseinate equal to about 0.5% by weight of the lithopone has been found sufficient to convert the foreign active compounds into the non-reactive condition, although more caseinate is not detrimental and less may be used.

The following example is illustrative of the invention:

To 10,000 grams of regular calcined lithopone in an aqueous slurry is added sufficient hydrochloric acid to produce a pH of 4. After acidification, the slurry is filtered and the pigment washed with acidified water at pH4. To the washed pigment in slurry form are added 40 grams of sodium caseinate dissolved in water, and the pH finally adjusted to 7 to 9 by the addition of sodium or potassium hydroxide or carbonate, or other suitable alkali. The pigment is then filtered, washed to remove alkali metal chlorides, dried and ground.

The pigment thus treated may be used with the customary drying vehicles employed in baking enamels, such as drying oils and varnishes with metallic driers, drying alkyd type vehicles, etc. together with solvents and thinners. When so used the baked finish containing the lithopone treated as above shows less discoloration than does the same enamel employing regular untreated lithopone.

It is believed that the retardation of discoloration accomplished by the present invention is due to the fact that the active foreign substances are replaced by proteinates, in which form they are non-reactive to cause discoloration on baking. Accordingly, it is not essential that the proteinate added to form the non-reactive compound be water-soluble, as other expedients may be employed to effect the desired reaction. However, an aqueous solution is a convenient and practical way to accomplish the desired reaction and is preferred.

Other proteinates than caseinate may be used to convert the active metal compounds into the non-reactive proteinate. Proteinates from vegetable proteins such as soy bean protein, peanut protein, etc. may be used. Also, instead of sodium caseinate or sodium proteinate, the corresponding potassium or ammonium compounds may be used. If desired, mixtures of two or more of the proteinates and caseinates of sodium, potassium and ammonium may be employed.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

This application is a continuation-in-part of my application Ser. No. 272,146, filed May 6, 1939.

I claim as my invention:

1. A process of treating calcined lithopone containing an active calcined compound of a metal of the group consisting of zinc, aluminum and the alkaline earth metals and which compound promotes discoloration when employed in baking enamels, said process comprising treating said lithopone with an aqueous acid solution, then forming insoluble, non-reactive proteinate with the metal of the soluble salt of said metal in the resulting mass by treating with a proteinate of a member of the group consisting of sodium, potassium and ammonium, and then adjusting the pH of the resulting mass to a value of at least 7.

2. A process of treating calcined lithopone containing active calcined compounds of the group of metals consisting of zinc, aluminum and the alkaline earth metals and which compounds promote discoloration when employed in baking enamels, said process comprising treating said lithopone with an aqueous acid solution, then forming insoluble, non-reactive proteinates with the metals of the soluble salts of said metals in the resulting mass by treating with a proteinate of a member of the group consisting of sodium, potassium and ammonium, and then adjusting the pH of the resulting mass to a value of at least 7.

3. A process of treating calcined lithopone containing an active calcined compound of a metal of the group consisting of zinc, aluminum and the alkaline earth metals and which compound promotes discoloration when employed in baking enamels, said process comprising treating said lithopone with an aqueous acid solution, then forming insoluble, non-reactive caseinate with the metal of the soluble salt of said metal in the resulting mass by treating with a caseinate of a member of the group consisting of sodium, potassium and ammonium, and then adjusting the pH of the resulting mass to 7 to 9.

4. A process of treating calcined lithopone containing active calcined compounds of the group of metals consisting of zinc, aluminum and the alkaline earth metals and which compounds promote discoloration when employed in baking enamels, said process comprising treating said lithopone with an aqueous acid solution, then forming insoluble, non-reactive caseinates with the metals of the soluble salts of said metals in the resulting mass by treating with a caseinate of a member of the group consisting of sodium, potassium and ammonium, and then adjusting the pH of the resulting mass to 7 to 9 by means of an alkali.

5. The process claimed in claim 3, wherein the caseinate of a member of the group consisting of sodium, potassium and ammonium is sodium caseinate.

6. A process of treating calcined lithopone containing active calcined compounds of the group of metals consisting of zinc, aluminum and the alkaline earth metals and which compounds promote discoloration when employed in baking enamels, said process comprising forming an aqueous slurry of the lithopone, acidifying the slurry and then forming insoluble, non-reactive proteinates with the metals of the soluble salts in the resulting mass by treating with a proteinate of a member of the group consisting of sodium, potassium and ammonium, and then adjusting the pH of the resulting mass to a value of at least 7.

7. The process of claim 6, in which the pH of the acidified slurry is approximately 4.

8. A process of treating calcined lithopone containing active calcined compounds of the group of metals consisting of zinc, aluminum and the alkaline earth metals and which compounds promote discoloration when employed in baking enamels, said process comprising forming an aqueous slurry of the lithopone, acidifying said slurry, filtering, washing the filtered pigment with acidified water and treating the washed pigment with sufficient soluble caseinate of a member of the group consisting of sodium, potassium and ammonium to form insoluble caseinates with the metals of the salts in said washed pigment, and then adjusting the pH of the resulting mass to a value of at least 7.

9. A process of treating calcined lithopone containing active calcined compounds of the group of metals consisting of zinc, aluminum and the alkaline earth metals and which compounds promote discoloration when employed in baking enamels, said process comprising forming an aqueous slurry of the lithopone, acidifying said slurry to a pH of approximately 4, filtering, washing the filtered pigment with acidified water and treating the washed pigment with sufficient soluble caseinate of a member of the group consisting of sodium, potassium and ammonium to form insoluble caseinates with the metals of the salts in said washed pigments, and then adjusting the pH of the resulting mass to a value of at least 7.

10. The method of claim 9 in which the amount of soluble caseinate employed is approximately 0.4% by weight of the lithopone.

11. The process claimed in claim 8, wherein the caseinate of a member of the group consisting of sodium, potassium and ammonium is sodium caseinate.

12. The process claimed in claim 9, wherein the caseinate of a member of the group consisting of sodium, potassium and ammonium is sodium caseinate, and amount of soluble caseinate employed is approximately 0.4% by weight of the lithopone.

KENNETH S. MOWLDS.